US 6,724,619 B2

(12) United States Patent
Kwong et al.

(10) Patent No.: US 6,724,619 B2
(45) Date of Patent: Apr. 20, 2004

(54) CONSOLE DRIVE

(76) Inventors: Bill Kwong, 20363 Leutar Ct., Saratoga, CA (US) 95070; Victor Chuan-Chen Wu, 21055 Lauretta Dr., Cupertino, CA (US) 95014

( * ) Notice: Subject to any disclaimer, the term of this patent is extended or adjusted under 35 U.S.C. 154(b) by 0 days.

(21) Appl. No.: 10/173,645

(22) Filed: Jun. 19, 2002

(65) Prior Publication Data

US 2003/0235030 A1 Dec. 25, 2003

(51) Int. Cl.[7] .................................................. G06F 1/16
(52) U.S. Cl. .................................... 361/685; 361/683
(58) Field of Search .............................. 361/682–686, 361/687

(56) References Cited

U.S. PATENT DOCUMENTS 5,067,041 A * 11/1991 Cooke et al. ............... 361/394
6,188,571 B1 * 2/2001 Roganti et al. ............. 361/685

OTHER PUBLICATIONS

Kwong et al. (US 2003/0112595 A1), "Universal Hard Disk Cartridge", Jun. 19, 2003.*

* cited by examiner

Primary Examiner—Darren Schuberg
Assistant Examiner—Yean-Hsi Chang
(74) Attorney, Agent, or Firm—Troxell Law Office PLLC

(57) ABSTRACT

A console drive that enables different sizes of storage devices to be conveniently added or removed from a computer or equipment without disassembling and reassembling the computer or equipment, having a console bay that is secured to a drive bay of the computer or equipment on the side by screws; a console tray that slides in and out of the console bay; and a console enclosure that slides in and out of the console tray for containing the storage devices and providing connection of the electrical signals of the storage devices.

8 Claims, 3 Drawing Sheets

CONSOLE DRIVE

BACKGROUND OF THE INVENTION

1. Field of the Invention

The present invention relates to a Console Drive that enables various types of storage devices to be easily swapped in and out of a drive bay of any desktop computers, Kiosk or computing equipment.

2. Description of Related Art

A standard desktop computer typically provides one or more compartments (also called drive bays) for the installation of 5¼ inch or 3½ inch storage devices such as CD ROM, DVD ROM or CDRW drive, hard drive, ZIP, Super-Disk etc. Because of space limitation, many desktop computers, Kiosk or computing equipment have only one to two drive bays, thus limiting the number of devices that can be installed. Once a storage device is installed into the drive compartment or drive bay, replacement or upgrade of the storage device requires careful disassembling and reassembling of the computer by a trained technician.

This invention provides a design of a Console Drive that enables various types of storage devices to be easily swapped in and out of a drive bay of any desktop computers, Kiosk or computing equipment. Storage devices can be changed on the fly for upgrade, repair or for different applications, without disassembling or reassembling of the equipment enclosure. In addition, the storage device enclosure of the Console Drive also enables any storage device to be used as an external storage device once it is removed from the drive bay. This external storage device can be connected to any computers or equipment via USB, Firewire, PCMCIA or any IO interface (reference to Universal Storage Interface Bus patent). So the Console Drive design adds great flexibility to the connectivity between the storage devices and any computer equipment. Console Drive design also eliminates the inconvenience and the high cost associated with repairing or upgrading any storage device from any computer equipment.

SUMMARY OF THE INVENTION

The object of the present invention is to provide a Console Drive that enables various types of storage devices to be easily swapped in and out of a drive bay of any desktop computers, Kiosk or computing equipment.

This invention provides a design of a Console Drive that enables various types of storage devices to be easily swapped in and out of a drive bay of any desktop computers, Kiosk or computing equipment. Storage devices can be changed on the fly for upgrade, repair or for different applications, without disassembling or reassembling of the equipment enclosure. In addition, the storage device enclosure of the Console Drive also enables any storage device to be used as an external storage device once it is removed from the drive bay. This external storage device can be connected to any computers or equipment via USB, Firewire, PCMCIA or any IO interface (reference to Universal Storage Interface Bus patent). So the Console Drive design adds great flexibility to the connectivity between the storage devices and any computer equipment. Console Drive design also eliminates the inconvenience and the high cost associated with repairing or upgrading any storage device from any computer equipment.

BRIEF DESCRIPTION OF THE DRAWINGS

The present invention can be more fully understood by reference of the following description and accompanying drawings, in which.

DETAILED DESCRIPTION OF THE PREFERRED EMBODIMENTS

Figure 1:
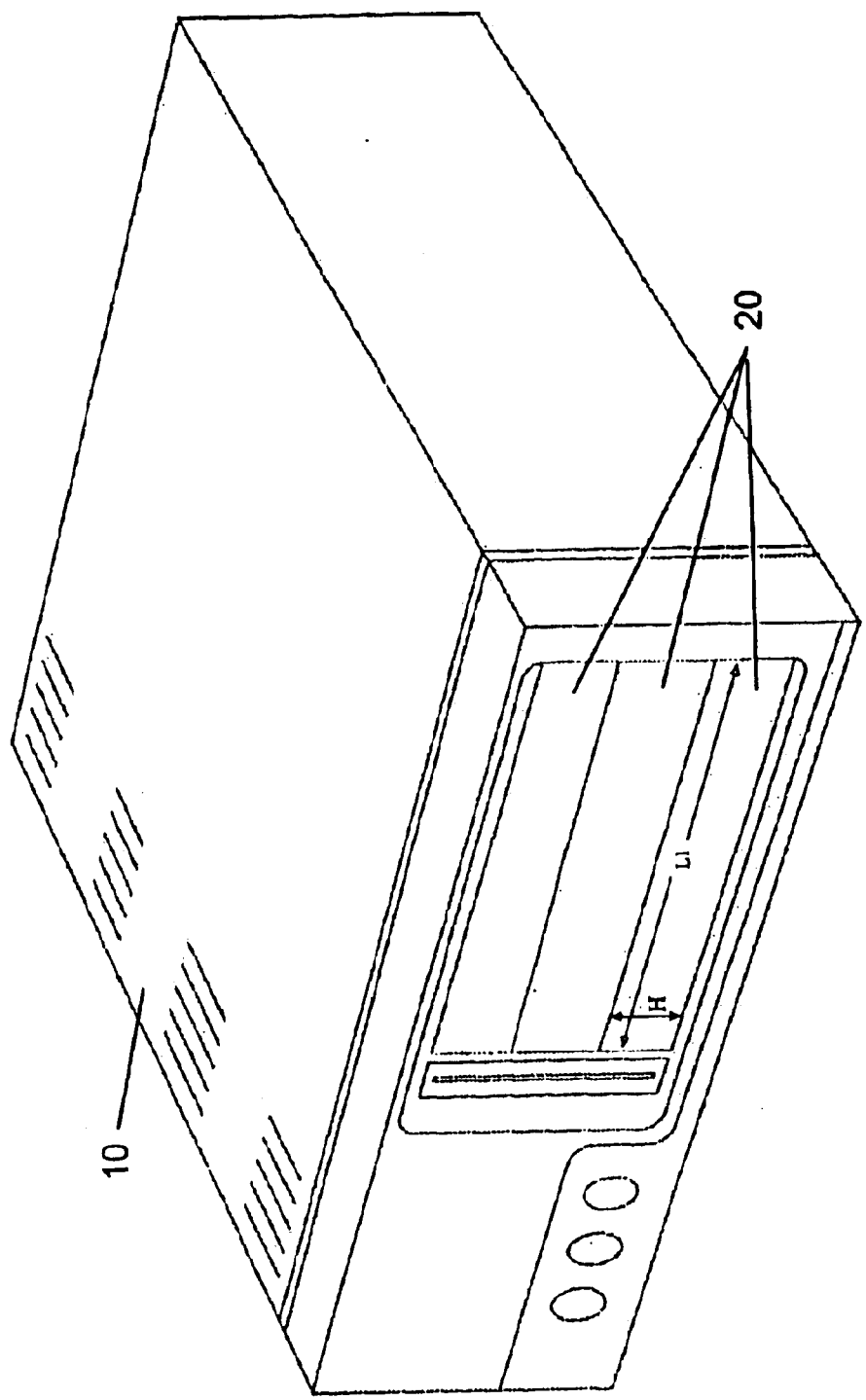
FIG. 1 shows a standard desktop computer with three 5¼" drive bays, each 5¼" drive bay has a dimension of L1 for the width and H for the height.

Referring to FIG. 1, which shows a standard desktop computer 10 with three 5¼" drive bays 20, each 5¼" drive bay 20 has a dimension of L1 for the width and H for the height.

Figure 2:
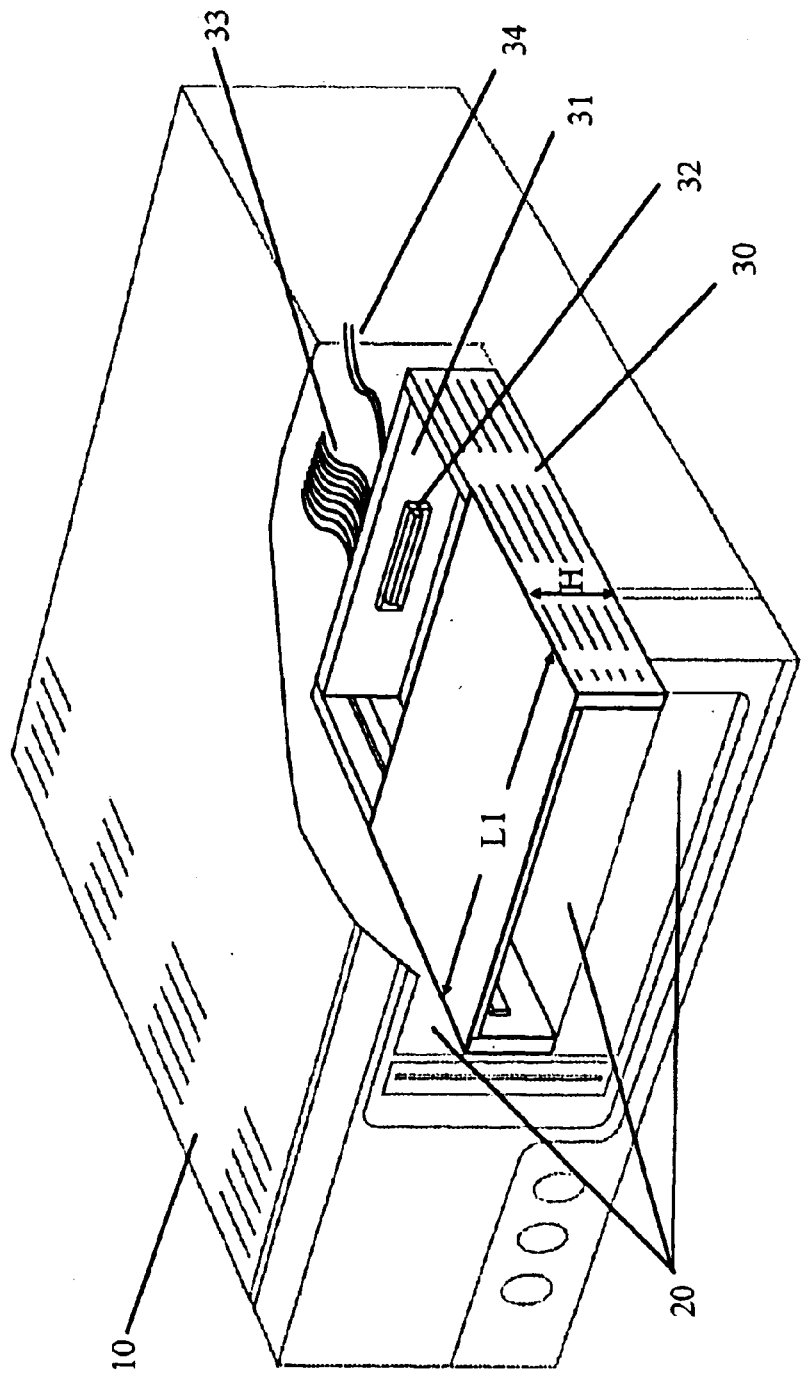
FIG. 2 illustrates the Console Bay of the Console Drive is first installed inside one of the 5¼" drive bays of the desktop computer.

Referring to FIG. 2, which illustrates the Console Bay 30 of the Console Drive is first installed inside one of the 5¼" drive bays 20 of the desktop computer 10. The Console Bay 30 is designed to have the same Width, L1 and height, H of the drive bay 20 so to create a snug fit when the Console Bay 30 is installed inside a standard 5¼" drive bay 20. Once inside the drive bay 20, the Console Bay 30 is secured to the drive bay 20 on the side by screws (not shown in the drawing for simplicity). The Console Bay 30 has a connector exchange circuit board 31, mounted at the back end of the Console Bay 30. The connector exchange circuit board 31 consists of a male MC-36 connector 32 facing towards the front of the bay 30. On the opposite side of the connector exchange circuit board 31 is a standard 40-pin IDE connector and a standard MC-36 male connector (behind the Console Bay 30 and not visible in the drawing). The standard 40-pin IDE connector on the back side of the exchange circuit board 31 is connected to the IDE controller on the motherboard (not shown in the drawing for simplicity) via a standard IDE ribbon cable 33. The MC-36 male connector on the same side of the 40-pin IDE connector can be used to connect to other interfaces such as Firewire or USB, using a Firewire to IDE or USB to IDE interface conversion cable 34 (reference to the U.S. patent application, Ser. No. 09/911,450, filed Jul. 25, 2001).

Figure 3:
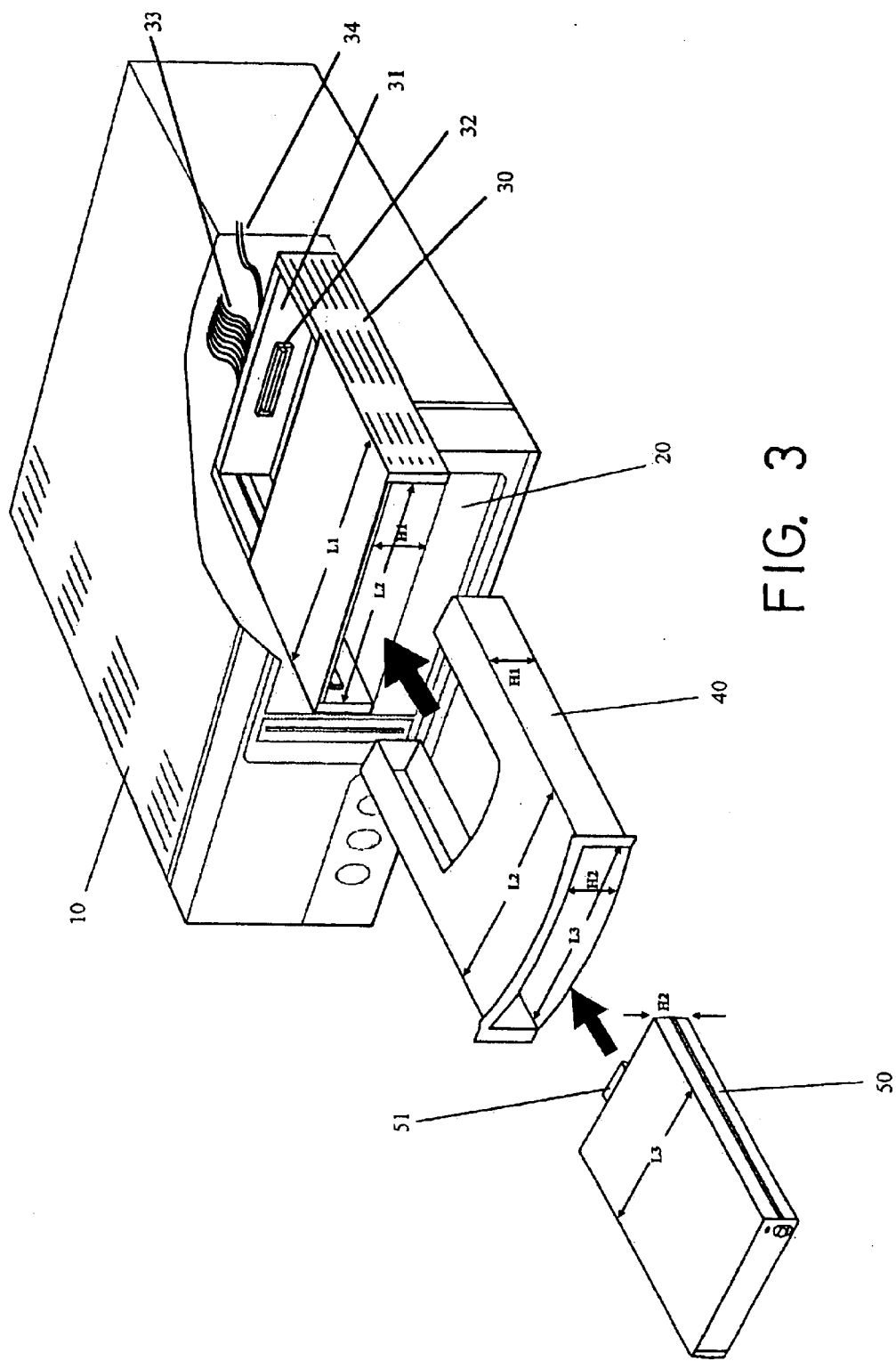
FIG. 3 illustrates how all the pieces of the Console drive fits together.

Referring to FIG. 3, which illustrates how all the pieces of the Console drive fits together. A Console Tray 40 that can slide in and out of the Console Bay 30, has outside width, L2 and outside height, H1, the same as the inside width and height of the Console Bay 30, to create a snug fit inside the Console Bay 30. A Console enclosure 50 that containing the storage device is designed to has an outside width, L3 and height, H2, the same as the inside width and height of the Console Tray 40, to have a snug fit sliding inside the Console Tray 40.

The Console Enclosure 50 has an inside width and height to accommodate any standard 3.5" IDE hard drive or 3.5" ATAPI devices. Inside the Console enclosure 50, the storage device is electrically connected to an interface circuit board and the electrical signal from the storage device is routed to a female MC-36 connector 51 that comes out the back of the Console enclosure 50. The female MC-36 connector 51 is located in a position to mate perfectly with the male MC-36 connector 31 when the Console enclosure 50 and the Console tray 40 are fully slide inside the Console Bay 30. This completes the connection of the storage device inside the Console enclosure 50 to the controller on the motherboard. The Storage device can be removed from the computer by sliding the Console tray 40 together with the Console enclosure 50 out of the Console Bay 30. Different 3.5" storage can then be added or removed from the Console Bay 30 for repair or for different applications without ever opening the enclosure of the computer.

Any storage devices can now be slide in and out of the Console Bay 30 by simply varying the width, L3 and height, H2 of the Console enclosure 50 and the corresponding inside width, L3 and height, H2 of the Console Tray 40 to accommodate the different sizes of the storage device, so long the width and height of the storage device are 3/8" smaller than the width and height of the drive bay on the computer or equipment. The 3/8" is to provide adequate wall thickness for the Console Drive Dock, Console Tray 40 and the Console Enclosure 50 combined. With this requirement, many storage devices that are not in 3.5" from factor such as the slim size ATPAI DVD-ROM, CD-ROM, CDRW and 2.5" hard drive can be accommodated inside a 5¼" drive bay.

While the invention has been disclosed with reference to preferred embodiments thereof, it is to be understood that modifications or variations may be easily made without departing from the spirit of this invention, which is defined in the appended claims.

What is claimed is:

1. A console drive that enables different sizes of storage devices to be conveniently added or removed from a computer or equipment without disassembling and reassembling the computer or equipment, comprising, a console bay that is secured to a drive bay of the computer or equipment on a side by screws;

a console tray that slides in and out of said console bay; and a console enclosure that slides in and out of said console tray containing the storage devices and providing connection of electrical signals of the storage devices, wherein said console enclosure turns an internal storage device into an external or removable storage device with a female MC-36 connector that mates securely with a male MC-36 connector inside said console bay when said console enclosure together with said console tray are fully inserted inside said console bay.

2. The console drive according to claim 1, wherein said console bay is mounted permanently inside a 5¼" drive bay.

3. The console drive according to claim 1, wherein said console bay further comprises a connector exchange PCB that provides connection between said removable storage (console enclosure) and a device selected from the group consisting of any standard storage interface on a motherboard of a computer and a control board of a equipment.

4. The console drive according to claim 1, wherein said console tray is a guide for adding and removing an external storage device to and from said console bay.

5. The console drive according to claim 1, wherein said console tray has outside dimensions equal inside dimensions of said console bay.

6. The console drive according to claim 1, wherein said console enclosure has outside dimensions equal inside dimensions of said console tray.

7. The console drive according to claim 1, wherein inside dimensions of said console tray and outside dimensions of said console enclosure are sized to accommodate differently sized storage devices, such that said storage devices are removably inserted into the console bay.

8. The console drive according to claim 1, wherein said storage device in said console enclosure is electrically connected to an interface circuit board and an electrical signal from the storage device is routed to the female MC-36 connector that comes out the back of said console enclosure.

* * * * *